W. Sellers,
Bolt Cutters.
No. 656. Reissued Feb. 8. 1859.
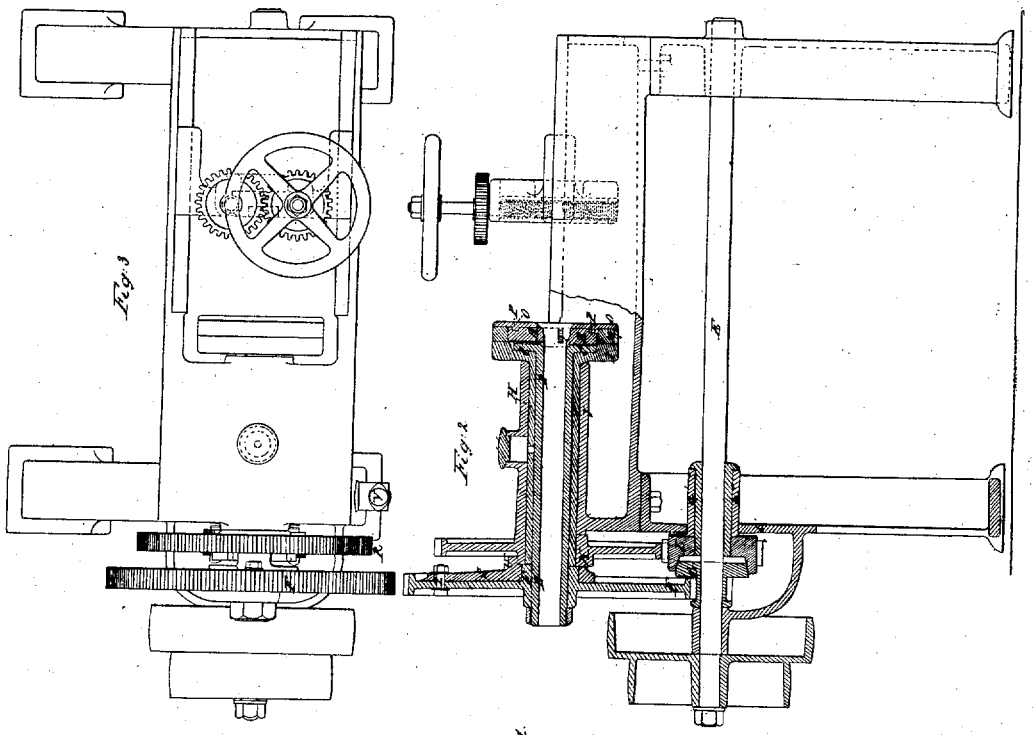
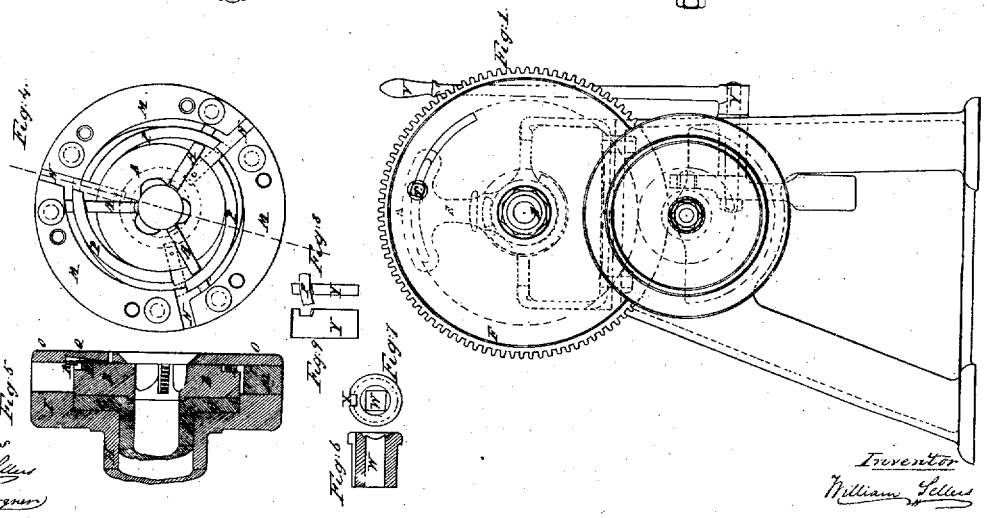
Witnesses
Coleman Sellers
Theodore Bergner
Inventor
William Sellers
THE NORRIS PETERS CO., WASHINGTON, D. C.

UNITED STATES PATENT OFFICE.

WILLIAM SELLERS, OF PHILADELPHIA, PENNSYLVANIA.

IMPROVED MACHINE FOR THREADING BOLTS.

Specification forming part of Letters Patent No. 18,775, dated December 1, 1857; Reissue No. 656, dated February 8, 1859.

*To all whom it may concern:*

Be it known that I, WILLIAM SELLERS, of Philadelphia, in the county of Philadelphia and State of Pennsylvania, have invented a new and useful Improvement in the Method of Holding and Operating the Dies and Holding the Tap in Bolt-Machines; and I do hereby declare that the following is a full and exact description of the construction and operation of the same, reference being had to the annexed drawing, making a part of this specification, in which—

Figure 1 is an end view. Fig. 2 is a vertical section through the center of the spindle. Fig. 3 is a plan of the whole machine. Fig. 4 is a plan of the die-holder and cam-box with the cover removed. Fig. 5 is a vertical section of the cam-box. Fig. 6 is a section through the center of the tap-holder. Fig. 7 is an end view of the tap-holder. Fig. 8 is an edge view of key for tap-holder, and Fig. 9 is a side view of same.

The object of my invention is to avoid the necessity of reversing the motion of the cutting-dies, or of stopping the machine to change the bolts, and to so arrange the die and tap holder as to admit of greater facility in changing from one size thread to another or to tapping nuts. To this end I place the dies A A A in a cylindrical piece of metal, B, which I call the "die-box," and which is provided with radial grooves of such size as to receive the dies and to allow them to slide freely in a radial direction. The die-box B is securely attached to the face-plate C of the hollow spindle D, which carries the spur-wheel F, that receives motion from the pulley-shaft E by means of the pinion G. Surrounding and sustaining the spindle D I place another hollow spindle, H, having a face-plate or flange, I, at one end. The spindle H is bolted to and is supported by the tubular piece J of the frame. On the face-plate I there are three eccentric or scroll cams, M M M, of equal eccentricity. They are securely bolted to the face-plate, leaving spaces N N N between them of sufficient width to admit the dies A A A to pass freely. On the outer surface of the cams M M M, I bolt a covering-plate, O, having on its inner surface three cams, P P P, parallel with the cams M M M, and three springs, Q Q Q, which springs are so placed as to form one side of the openings N N N through which the dies are inserted, and having also projections R R R, which form a continuation of the cams P P P. These springs are for the purpose of keeping the dies from sliding out of the openings N N N whenever the dies are opened for the purpose of removing the bolt, and also to govern the position of the dies when first entered, so as to guide them upon the cams P P P. The face-plate I, cams M M M, and cover O, with its cams P P P, I call the "cam-box."

On the wheel F, and moving freely a suitable distance around the hub thereof, I provide an adjustable stop, S, which may be securely attached to the wheel F by means of the bolt T, and having near its center a projection, U, which is of such length as to come in contact with a similar projection on the wheel K, thereby conveying motion to the wheel K and spindle H from the pulley-shaft E.

To put the machine in operation, it is necessary, first, to move the die-box B into such a position that the grooves to receive the dies shall correspond with the openings N N N between the cams M M M. Into these openings the dies are then inserted and pushed forward until the projection R on the spring Q falls into an opening in the edge of the die, which is made to receive one of the cams P, which cams are for the purpose of withdrawing the die from the center. The dies now being in the die-holder, the next operation will be to adjust them to the size of the bolt to be cut. This is accomplished by slacking the set-bolt T on the adjustable stop S, and then moving the die-box B by means of the pulley-shaft E, pinion G, and wheel F, the wheels K with the cams M M M being held stationary. As this is done the dies A A A will be gradually forced by the cams M M M toward their common center and closed upon any finished bolt or other object to which it may be desired to set them. While the wheels are in this position the adjustable stop S is moved so as to bring the projection U near its center in contact with a similar projection on the wheel K, when the set-bolt T may be secured. If, now, the wheel F be turned in the same direction as before, it will carry with it the wheel K and cams M M M, and as the dies A A A and cams M M M will be then moving in the same direction and at the same velocity there will be no farther movement of the dies in a radial direction.

To open the dies for the purpose of withdrawing the bolt, the pulley-shaft E being in motion, the pinion L must be moved by means of the loose collar *a'* and handle V, so as to tighten the friction-clutch G L, which will give an equal velocity to the two pinions G and L; but, as the pinion L is larger than the pinion G, the wheel K, which is driven by L, will move faster than the wheel F, which is driven by G, thereby causing the cam-box to move around the dies in the opposite direction to that first described, and the cams P P P will force the dies from the center.

To close the dies preparatory to or during the operation of cutting the bolt, the pulley-shaft E being in motion, the pinion L is forced by means of the loose collar *a'* and handle V against the leg *l'*, which is covered here by a piece of leather, so as to create friction. This will cause the pinion to stop, together with the wheel K and cams M M M. The motion of the wheel F and die-box B will, however, continue, thus causing the dies A A A to revolve as first described, thereby closing the dies until the projection on the stop S comes in contact with the similar projection on the wheel K, compelling it to move at the same velocity, when no farther movement of the dies in a radial direction will take place.

The cutting-edge of the dies may be formed so as to cut a full thread by once passing over the bolt. This is accomplished by first cutting a thread in the dies perfectly straight and cylindrical and of such size as to fit the bolt where it has the thread cut upon it. The tops of the threads in the dies are then dressed off, commencing at the base of the thread, where the bolt is entered, and terminating at the top of the thread about four threads from the point of entrance. They are at the same time to be dressed back from the cutting-edge, so as to give a clearance. Each thread of the dies will thus form a cutting-edge, and the thread upon the bolt will be formed by a series of cuts, each one deeper than its predecessor, until the perfect thread is developed.

To fit the machine for tapping nuts, I provide a cylindrical piece of metal, W, which is turned to fit accurately in the hollow spindle D and die-box B, having a square hole through its center to receive the shank of the tap. In its outer surface I cut a square recess, X, of the same width as the grooves in the die-box B, which receives the dies A A A. Having removed the dies, I insert in the place of one of them a piece of metal, Y, of the same shape and size as the die, having the end nearest the center of the die-box made square, so as to fit in the recess X of the cylindrical piece W, and which serves as a key to prevent the piece W from turning in its place, the piece Y being forced into the recess X by the operation of the cam M, as described in the process for cutting bolts. The square shank of the tap is slipped into the hole of the same shape in the piece W, and the nut to be operated upon by the tap may be held by any of the numerous devices now in use for that purpose.

Having thus fully described my invention, what I claim as new, and desire to secure by Letters Patent, is—

1. The use of rotating dies, in combination with cams or their equivalent, when both are so arranged as to be capable of revolving about a common center at different velocities, for the purpose of opening and closing the dies, substantially as described.

2. The arrangement of cams with open spaces between them, in combination with the die-box and dies, substantially as described, to facilitate the changing of the dies.

3. The mode of attaching the tap-holder to the revolving die-box, substantially as described.

WM. SELLERS.

Witnesses:
COLEMAN SELLERS,
THEODORE BERGNER.